United States Patent [19]

Laursen et al.

[11] Patent Number: 4,871,487
[45] Date of Patent: Oct. 3, 1989

[54] METHOD OF MAKING A POLYMERIC OPTICAL WAVEGUIDE BY COEXTRUSION

[75] Inventors: Larry J. Laursen, Midland; Virgil W. Coomer, Shepherd; Walter J. Schrenk, Midland, all of Mich.

[73] Assignee: The Dow Chemical Company, Midland, Mich.

[21] Appl. No.: 3,774

[22] Filed: Jan. 16, 1987

[51] Int. Cl.$^4$ .......................... B29D 11/00; G02B 6/16
[52] U.S. Cl. ...................................... 264/1.5; 264/1.9; 264/174; 264/293; 350/96.3
[58] Field of Search .................. 264/1.5, 1.9, 174, 293; 350/96.29, 96.16, 96.3

[56] References Cited

U.S. PATENT DOCUMENTS

| | | |
|---|---|---|
| 2,825,260 | 3/1958 | O'Brien .............................. 264/1.5 |
| 3,261,350 | 7/1966 | Wallace . |
| 3,308,508 | 3/1967 | Schrenk . |
| 3,386,043 | 5/1963 | Marcatili . |
| 3,436,141 | 4/1969 | Comte . |
| 3,483,786 | 6/1971 | Marcatili . |
| 3,498,286 | 3/1970 | Polayni et al. . |
| 3,556,635 | 1/1971 | Schrenk et al. . |
| 3,641,332 | 2/1972 | Reick et al. . |
| 3,736,217 | 5/1973 | Nagao ................................. 264/1.5 |
| 3,740,112 | 6/1972 | Lundgren . |
| 3,740,113 | 6/1973 | Cass . |
| 3,843,865 | 10/1974 | Nath . |
| 3,902,880 | 9/1975 | Strack . |
| 3,973,828 | 8/1976 | Onoda et al. . |
| 3,980,390 | 9/1976 | Yamamoto et al. . |
| 3,999,834 | 12/1976 | Ohtomo et al. . |
| 4,000,416 | 12/1976 | Goell . |
| 4,053,205 | 10/1977 | Miller . |
| 4,161,500 | 7/1979 | Schleinitz et al. . |
| 4,165,152 | 8/1979 | Shiraishi et al. . |
| 4,167,305 | 9/1979 | Ichiba et al. . |
| 4,183,617 | 1/1980 | Isaacs et al. . |
| 4,220,395 | 9/1980 | Wang et al. . |
| 4,252,403 | 2/1981 | Salisbury . |
| 4,270,840 | 6/1981 | Uchida et al. . |
| 4,363,533 | 12/1982 | Stowe et al. . |
| 4,392,715 | 7/1983 | Bonewitz et al. . |
| 4,437,727 | 3/1984 | Treber . |
| 4,453,803 | 6/1984 | Hidaka et al. . |
| 4,458,986 | 7/1984 | Yuto . |
| 4,490,008 | 12/1984 | Murakami et al. . |
| 4,505,542 | 3/1985 | Clarke . |
| 4,505,543 | 3/1985 | Ueba et al. . |
| 4,511,209 | 4/1985 | Skutnik . |
| 4,521,351 | 6/1985 | Ohtsuka et al. . |
| 4,522,431 | 11/1985 | Allemand et al. . |
| 4,530,569 | 7/1985 | Squire . |
| 4,547,040 | 10/1985 | Yamamoto et al. . |
| 4,568,146 | 2/1986 | Ueba et al. . |
| 4,585,306 | 4/1986 | Ohmori et al. . |
| 4,689,483 | 8/1987 | Weinberger . |
| 4,689,926 | 8/1987 | Smith . |
| 4,721,350 | 1/1988 | Mori ................................. 350/96.15 |
| 4,744,617 | 5/1988 | Hvezda et al. ................... 350/96.16 |

FOREIGN PATENT DOCUMENTS

| | | |
|---|---|---|
| 0097325 | 4/1984 | European Pat. Off. . |
| 0165842 | 12/1985 | European Pat. Off. . |
| 0173266 | 3/1986 | European Pat. Off. . |
| 0178088 | 4/1986 | European Pat. Off. . |
| 53-42261 | 11/1978 | Japan . |
| 55-15293 | 4/1980 | Japan . |
| 111811 | 9/1981 | Japan ............................. 350/36.15 |
| 58-18608 | 2/1983 | Japan . |
| 60-54830 | 3/1985 | Japan . |
| 93402 | 5/1985 | Japan ............................. 350/96.15 |
| 60-242404 | 12/1985 | Japan . |
| 60-247605 | 12/1985 | Japan . |
| 3107 | 1/1986 | Japan ............................. 350/96.16 |
| 179434 | 3/1986 | Japan . |

OTHER PUBLICATIONS

Harrington, J. A., "Medical Needs Drive IR Fiber Development", *Photonics Spectra*, Jul. 1987, pp. 61–63.

*Primary Examiner*—James Lowe
*Attorney, Agent, or Firm*—Harness, Dickey & Pierce; William J. Coughlin

[57] ABSTRACT

A quadrangular optical waveguide is formed by the coextrusion of polymeric materials. The waveguide comprises a solid light conducting core which is encased in a cladding layer having a lower index of refraction. Taps may be formed in the waveguide by a heated probe to deflect light out of the waveguide.

10 Claims, 3 Drawing Sheets

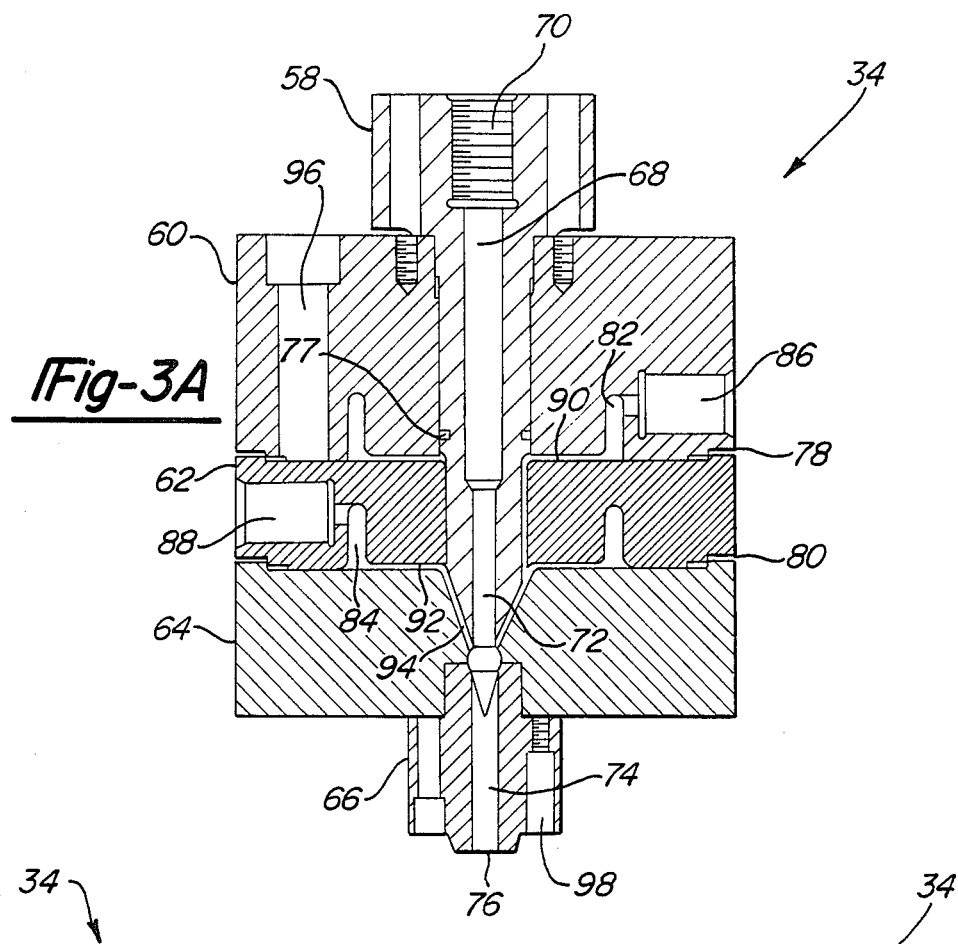
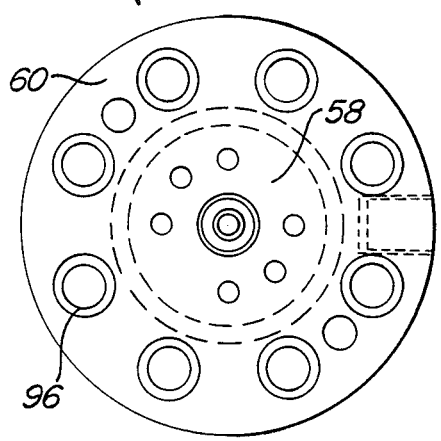
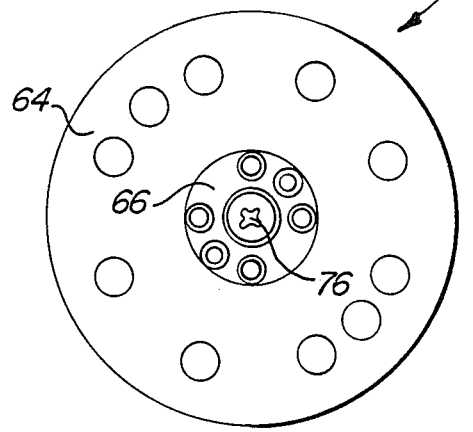

METHOD OF MAKING A POLYMERIC OPTICAL WAVEGUIDE BY COEXTRUSION

BACKGROUND OF THE INVENTION

The present invention generally relates to fiber optic systems and, more particularly, to a method of making a polymeric optical waveguide by coextrusion which has at least one flat side.

Fiber optics have revolutionized the communications field and are finding many applications in the medical field. Fiber optics are also providing useful in areas as diverse as computer systems, automotive systems, aerospace systems, and advertising signs. Thus, there is an ever-present need for refining and improving upon fiber optic systems for use in a wide range of industries. In this regard, the following patent applications of the assignee are hereby incorporated by reference: Larry J. Laursen, et. al., U.S. patent application Ser. No. 07/003977, entitled "A Method Of Making A Hollow Light Pipe", filed on even date herewith; Theodore L. Parker, et. al., U.S. patent application Ser. No. 07/008083, entitled "Polymeric Optical Fiber", filed Jan. 21, 1987, now abandoned in favor of Ser. No. 07/143997 filed on Oct. 8, 1987, now U.S. Pat. No. 4,834,498; and Theodore L. Parker, et. al., U.S. patent application Ser. No. 831,775, now abandoned, entitled "Polymeric Optical Fiber", filed on Feb. 20, 1986, now abandoned.

A variety of translucent/transparent materials, such as glass and amorphous polymers, have been utilized as light-conducting fibers in fiber optic systems. However, polymers offer several advantages over other fiber optic materials for applications where a small degree of signal loss is acceptable. For example, plastics have a higher numerical aperture than glass. Additionally, polymer fibers are relatively inexpensive and lightweight. They are also flexible and resistant to breakage, thereby facilitating assembly and installation. Other advantages include the fibers' immunity to electromagnetic interference. This is particularly important in automotive applications, where sophisticated multiplex data systems are subjected to electromagnetic interference generated by the alternator and spark plugs.

Light-conducting fibers in fiber optic systems are generally encased in a sheath or cladding of material having a lower index of refraction that the conducting fibers. Proper indices of refraction of the conducting material and cladding are necessary to provide a high degree of internal reflection of light traveling down the fiber and to provide an appropriate numerical aperture for the transmitting system. The greater the difference in refractive indices, the greater the numerical aperture and, thus, the more light will be trapped and transmitted through the optical waveguide. Accordingly, the lower index of refraction of the cladding relative to that of the core material enables the cladding layer to reflect light inwardly toward the core as the light travels down through the conducting core. While air has a lower index of refraction (i.e., 1.0) than any plastic material that could be used for the cladding, the plastic cladding protects the surface of the core from dust, dirt, and scratching. Thus, a plastic cladding is desirable since it can provide a smooth and continuous interface at the surface of the core, and thereby minimize the dispersion of light into the surrounding environment.

Optical waveguides are typically round in cross-section due to the currently available methods of manufacture. However, for certain uses, quadrangular waveguides would be preferable to round waveguides. For example, generally squared shaped waveguides can be made in closely packed arrays, such as shown in Schrenk, et. al., U.S. Pat. No. 3,556,635, entitled "Fiber Optic Bundle", and issued to Schrenk, et. al., on Jan. 19, 1971.

One prior attempt at making a square optical bus involved forming the core material in a mold and then coating the core with a cladding material. However, such a method would have several practical drawbacks. For example, this approach severely limits the length of fiber that can be made. Furthermore, the adhesion and interface smoothness between the cladding and core materials would be difficult to achieve with this procedure.

Thus it would be desirable to provide a method of making a polymeric waveguide which can be used as an optical bus in communication applications.

It would further be desirable to provide a method of making a polymeric waveguide which achieves a smooth and adherent interface between the cladding layer and the light conducting core.

It would additionally be desirable to provide a method of making a polymeric waveguide in the form of a polygon having at least one substantially flat side.

It would also be highly desirable to provide a continuous, high speed and, therefore low-cost, method and apparatus for producing quadrangular optical waveguides of any desired length with the above-described properties.

SUMMARY OF THE INVENTION

The present invention provides a method of making a polymeric waveguide which can be used as an optical bus. The present invention also provides a continuous high-speed method and apparatus for producing polygonal optical waveguides having at least one flat side of any desired length with a smooth, continuous and parallel/flat interface between the cladding and core.

The method and apparatus of the present invention for constructing a polygonal optical waveguide involves the coextrusion of polymeric cladding and core conducting materials. The cladding and core polymeric materials are first heated and plasticized through separate extruders, and then processed through a coextrusion die. The coextrusion die of the present invention forms the cladding layer around the core in an intermediate configuration having at least one concave side. Smooth and well-adhering interfaces between the core and cladding layers are achieved because these layers are joined together while both are in a plasticized state. The coextruded material discharged from the die is then drawn at a temperature that will allow molecular orientation and final shaping of the waveguide materials. The waveguide materials are then cooled to a temperature that will retain the desired molecular orientation and shape. The optical waveguide can then be collected on a spool or the like and packaged.

In accordance with the present invention, indentations or taps may be formed in the waveguide using a heated probe having a predetermined shape. Preferably the probe is formed to provide a deflecting surface in the waveguide which extends at a 45° angle to the direction of light transmission through the waveguide. The quadrangular configuration of the waveguide also facilitates the proper formation of a plurality of indentations for tapping off light signals traveling down the waveguide by providing a generally flat surface for aligning these indentations.

Further features and advantages of the present invention will become more apparent from the following specification taken in connection with the drawings wherein:

BRIEF DESCRIPTION OF THE DRAWINGS

FIG. 3A is a cross-sectional view of a coextrusion die of the present invention.

FIG. 3B is a top elevation view of the coextrusion die shown in FIG. 3A.

FIG. 3C is a bottom elevation view of the coextrusion die shown in FIG. 3A.

DETAILED DESCRIPTION OF THE PREFERRED EMBODIMENT

Figure 1A:
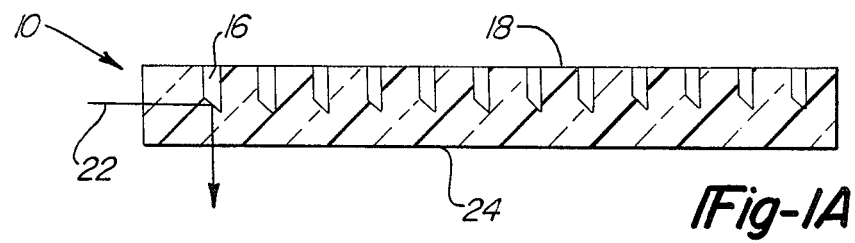
FIG. 1A is a side view of a polymeric optical waveguide manufactured according to the present invention, particularly illustrating the indentations for permitting light to be deflected out of the waveguide.

Referring to FIGS. 1A, B and C, an optical waveguide 10 produced according to the present invention is shown as a two-layered structure constructed of polymeric materials. Although the waveguide 10 has an outer configuration which is generally square in cross-section, it should be appreciated that the present invention may be used to produce a waveguide having any configuration which is suitable for axis orientation and light deflection capabilities. Thus, for example, the waveguide should have at least one flat surface and a parallel core/cladding interface for enabling light to be deflected and directed out of the waveguide. It should further be appreciated that the dimensions and thickness of the optical waveguide and its layers may be varied to suit particular dimension and thickness requirements.

The waveguide or optical bus 10 comprises a light conducting core layer 12 sheathed in an outer cladding layer 14. In order to effectuate the reflection of light by the cladding layer 14 into the conducting core layer 12, the material comprising the cladding layer is selected to possess a lower index of refraction than that of the material comprising the core layer 12. A maximum difference in the refractive indices of the cladding 14 and conducting core 12 layers is desirable, because it provides a larger numerical aperture for the incident light entering the core layer. The conducting core material should also be clear, transparent, or at least translucent to permit an effective transmission of light through the waveguide. Additionally, any polymer utilized for the core layer 12 should preferably be in the amorphous rather than crystalline state.

As shown in FIGS. 1A, B and C, indentations 16 may be made into the optical waveguide in order to allow the waveguide to deflect and divert light out of the waveguide. In particular, FIG. 1A shows that a plurality of indentations or taps 16 are formed along side 18 of the waveguide 10. Since the side 18 provides a substantially flat surface, it facilitates the alignment of the indentations 16 along the length of the waveguide 10, as well as the orientation of the indentations in the waveguide. Preferably, the indentations 16 should be directed into the waveguide at an angle which is generally transverse to the direction of light traveling down the waveguide. However, other suitable orientations may be provided in the appropriate application, as the indentation need only provide a relatively small light deflecting surface 20.

The light deflecting surface 20 may have any shape which will enable a small percentage of the light traveling down the waveguide 10 to be deflected out of the waveguide, as illustrated by the arrow designated by reference numeral 22. Thus, while the indentations 16 are shown to have a generally circular shape, other geometric shapes may be employed which are appropriate to the application of the waveguide. In this embodiment, each indentation 16 is adapted to deflect or tap off approximately 3% of the light being transmitted through the waveguide.

Since the cladding 14 has a lower index of refraction than the core 12, the waveguide 10 should be formed with a substantially flat side 24 which is generally perpendicular to the direction of light being deflected from the waveguide. Such a configuration will enable the deflected light to pass through and out of the cladding layer 14 where it can be channeled for further transmission. Such a structure is particularly useful in data communication systems using laser generated light signals. The quadrangular shape of the waveguide 10 also provides the opportunity to directly couple fibers to similarly shaped light detectors and light sources.

In accordance with the present invention, the indentations are preferably formed by impressing or inserting a heated probe 26 a desired distance into the waveguide 10. With the core and cladding layers made from thermoplastic materials, the cladding will flow into the hole being formed by the probe. The probe 26 preferably has a shape which will form the surface 20 at an approximately 45° angle to the direction of light transmission through the waveguide. However, any suitable probe shape may be provided to create a critical angle which is too steep for the cladding 14 to trap the light signals being deflected. It should be noted that one of the advantages of the tapping method according to the present invention is that the deflecting surface need not be metalized. Additionally, the indentations 16 may be formed during or after the waveguide 10 is formed, and a mold is not required to create these indentations.

Preferred materials for constructing the optical core 12 include polystyrene, which has a refractive index of approximately 1.59. When polystyrene is used as the conducting core layer 12, polymethyl methacrylate (PMMA) is preferred for the cladding layer 14. PMMA has a refractive index of approximately 1.49. It should be appreciated, however, that other polymeric materials with sufficient differences in their indices of refraction (i.e., more than 0.03) can be employed. For example, PMMA or styrene alpha-methylstyrene (SAMS) could be used for the conducting core layer 12 and polyvinylidene fluoride (PVDF) could be used for the cladding layer 14. Since polyvinylidene fluoride has a refractive index of 1.42, a difference in refractive indices of 0.07 would be provided. It should further be appreciated that the polymeric material used for the core and cladding layers need not be composed of single polymers, but could be composed of suitable copolymers. In one embodiment of the present invention, the polystyrene core layer 12 is approximately 1.5 mm. in thickness and the cladding layer is approximately 0.1 mm. in thickness.

Figure 2:
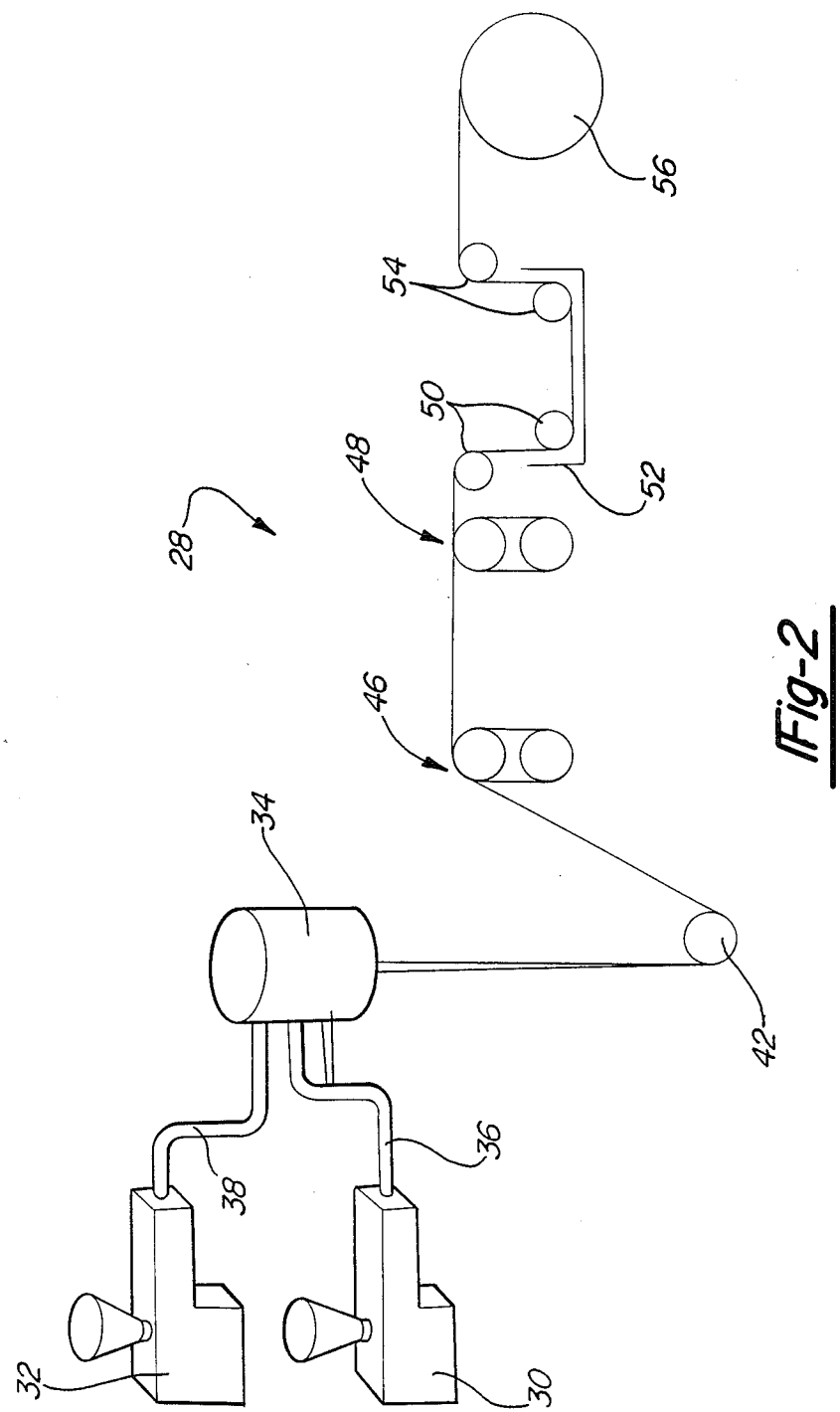
FIG. 2 is a schematic representation of a method and apparatus for constructing a polymeric waveguide in accordance with the present invention.

Referring to FIG. 2, a schematic representation of an apparatus 28 for constructing the optical waveguide 10 is shown. The co-extrusion process according to the present invention begins with the individual extrusion of the polymer materials used for the cladding and the core. A first hopper-fed extruder 30 is used for the cladding material and a second hopper-fed extruder 32 is used for the light conducting core material. The extruders 30-32 heat and plasticize the core and cladding materials. The plasticized materials are then forwarded to a coextrusion die 34 through extruder outlets 36 and 38, which are in fluid communication with the interior of the coextrusion die 34. Although the extruders in FIG. 2 are depicted as hopper-fed, it should be appreciated that the extruders need not be hopper-fed, but may have any other suitable means for feeding the polymer into the extruder die 34. Thus, for example, gear pumps could be provided between the extruders 30-32 and the coextrusion die 34 for volumetric metering. Otherwise, the extruder outlets 36 and 38 could merely be comprised of adapters for connecting the extruders 30 and 32 to the coextrusion die 34. The coextrusion die 34 receives the plasticized extruder products and forms the optical waveguide by coextruding a two-layer solid rod 40 which has four concave sides (e.g., a concavo-concave configuration).

As further shown in FIG. 2, the coextruded rod 40, now having a cladding layer 14 and a core layer 12, is discharged from the coextrusion die 34. A shroud (not shown) may be used to surround the rod 40 as it exits the coextrusion die 34 to prevent stray air currents from causing preferential cooling of portions of the rod. A water jacket (not shown) around the exiting rod 40 may also be used as a radiant heat sink to begin quenching and stabilizing the materials of the exiting rod. The coextruded rod 40 then travels along a flat idler pulley 42 which is used to prevent twisting of the rod. The coextruded rod 40 is then wrapped around a first set of godet rolls 46 which draws the rod at a first predetermined speed. The rod 40 is then wrapped around a second set of godet rolls 48 which runs at a second predetermined speed. The second set of godet rolls operates at a higher speed than the first set of godet rolls to achieve a desired molecular orientation and shape of the optical waveguide. The rod 40 is preferably wrapped twice around the second set of godet rolls 48 to prevent slippage at the higher speed.

The coextruded rod 40 then passes over a first set of rollers 50 and into a coolant bath 52. The rod 40 is then removed from the coolant bath 52 via a second set of rollers 54 and then collected around a spooled winder 56. It should be appreciated that, although godet rollers are shown, any roller mechanism suitable to prevent slippage of the material during drawing may be employed, such as serpentine rolls. Temperature controlled rollers may also be used to maintain desired temperatures during the drawing process. Yet another alternative to optimize orientation of the materials would be to control the draw zone temperature in an oven-like apparatus. Additionally, it should be understood that the core and cladding materials of the rod 40 should be above the glass transition temperatures of these materials, so that undue stress is not created in the rod. In general, the lower that the temperature is, the more stress will be created in the rod, and a higher molecular orientation will be achieved. However, the temperature should be sufficiently above the glass transition temperature to prevent the cladding from becoming brittle.

In a preferred embodiment of this invention, pellets of thoroughly dried polystyrene core material are fed into the screw extruder 30, which has 1.25 inch exit diameter. The zone temperatures of the extruder 30 are set at 350°, 390° and 400° F. along the length of the extruder 30. Simultaneously, thoroughly dried PMMA is fed into the screw extruder 32, which has a 0.75 inch exit diameter. The zone temperatures of the second extruder 32 is set at 400°, 400° and 410° F. One or more heater bands may be disposed around the extrusion die 34 to control the temperature within the die.

FIG. 3A depicts a cross-sectional view of a coextrusion die 34 according to the present invention. As shown in FIG. 3A, the coextrusion die 34 includes a mandrel 58, three adjacent die plates 60-64, a die orifice 66. Each of the die plates has a centrally disposed aperture, which are aligned within the die 32. The mandrel 58 and the die plates 60-64 are preferably constructed of steel. The first and second die plates provide manifold plates which receive plasticized cladding material from its extruder outlet 36. While two manifold plates are shown, it should be appreciated that only one need be provided for introducing the cladding material into the die. However, the additional die plate could enable an intermediate cladding layer to be introduced between the primary cladding layer and the core to provide adhesion when incompatible materials are used for the primary cladding and the core. The third die plate 64 provides a converging plate for tapering the diameter of the flow of the cladding material through the die. The generally cylindrical mandrel 58 is axially disposed within the centrally disposed apertures defined by the die plate. The mandrel 58 has a centrally disposed generally cylindrically shaped core channel 68 which has an inlet 70 for receiving extruded core material from its extruder outlet 36. The core channel 68 further includes an outlet 72 for discharging the core and clad materials into a forming chamber 74 of the die orifice 66. The forming chamber 74 includes a shaped outlet 76 having four concave sides, which is in fluid communication with the core channel 68. The chamber 74 is tapered to gradually force the rod 40 into a concave configuration prior to its discharge from the die 34.

As shown in FIG. 3A, the first cladding manifold plate 60 has a length which will provide substantial lateral support for the mandrel 58 and keep it from cocking during assembly of the die 34. It should be appreciated, however, that the first manifold plate 60 need not be the longest die plate, but may be of any length sufficient to support the mandrel 58 in position during operation. Each die plate of the coextrusion die 34 is in a sealing arrangement with the die plate adjacent to it. Additionally, the mandrel 58 is provided with an annular groove 77 which is used to seat an o-ring seal. Clearances 78 and 80 are provided between adjacent plates at their outer periphery to ensure that the seal is made near the first and second manifolds 82-84.

The first and second manifolds 82-84 are respectively formed in the first and second manifold plates, 60-62. Each manifold 82 and 84 extends in a circular band or ring which is generally coaxially disposed around the channel 68. The manifolds are in fluid communication with the material inlets 86 and 88 which receive plasticized cladding from the extruder outlet 36. One or both of the manifolds 82-84 may be provided with a bleed outlet for cutting material flow to the die 34. The first and second manifolds 82-84 communicate with layer passageways 90-92, respectively, which run along the adjacent surfaces of the die plates 60-64.

The layer passageways 90-92 are in fluid communication with a common passageway 94. The common passageway 94 is tubular in configuration communicates with the layer passageways 90-92. The common passageway 94 runs along the portion of the mandrel adjacent to the second die plate 62 and is in fluid communication with the outlet 72 of the core channel 68. The converging plate 64 and the lower portion of the mandrel 58 contained therewithin, converge in a funnel shaped configuration. Thus, the portion of the common passageway 94 defined by the adjacent surfaces of the converging plate 64 and the mandrel 58 reduces the diameter of the flow of cladding material, and directs the flow of cladding material around the flow of the core material.

Referring to FIGS. 3B and 3C, a top elevation view and a bottom elevation view of the coextrusion die 34 are shown respectively. The die plates 60-64 of the coextrusion die are held together by a plurality of bolts which pass through the length of the coextrusion die plates via bolt holes 96. The die orifice 66 and the mandrel 58 are also bolted to their respective die plates. Each of the die plates, the die orifice and the mandrel have a plurality of jack screws disposed circumferentially around their periphery, such as at jack screw hole 98. The jack screws are used for separating these components for maintenance purposes and the like.

Figure 1B:
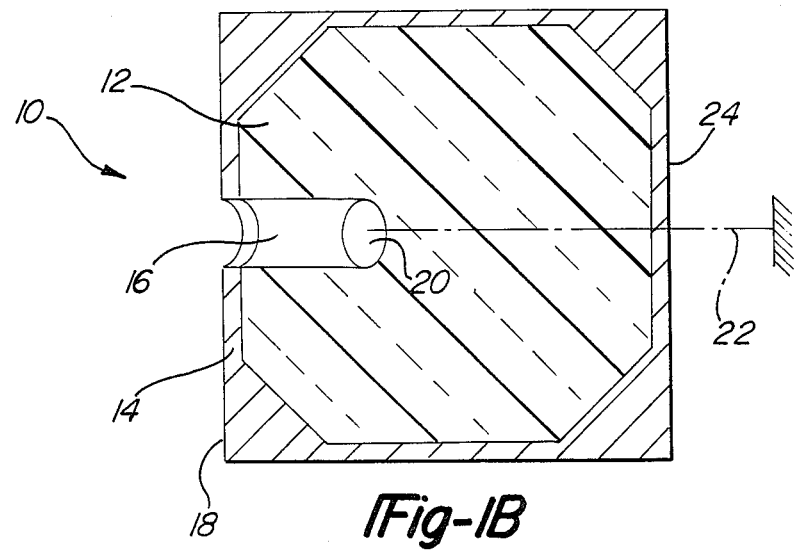
FIG. 1B is a cross-sectional view of a polymeric optical waveguide of the present invention, particularly illustrating the square outer configuration of the cladding layer and a tap or indentation formed in waveguide.
Figure 1C:
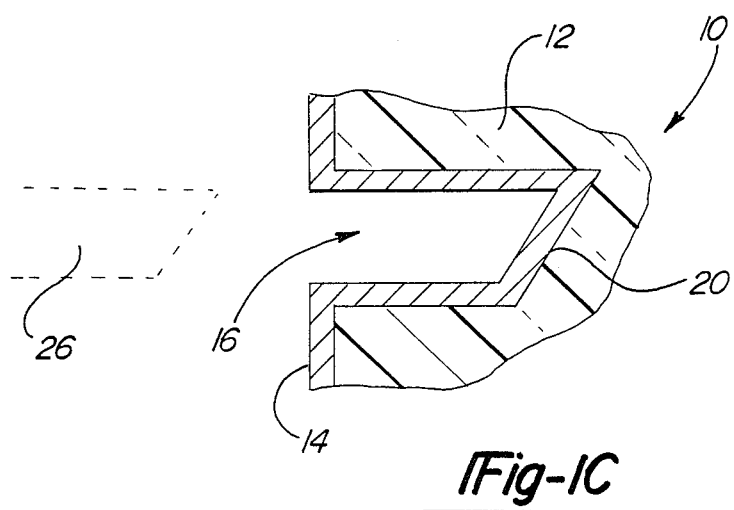
FIG. 1C is a fragmentary cross-sectional view of the optical waveguide of FIG. 1A, particularly illustrating the shape of an indentation formed in the waveguide.

FIG. 3B particularly illustrates the four sided concave butterfly shape or configuration of the outlet 76 of the die orifice 66. It was found that the precise shape of the forming chamber 74 and the outlet 76 may be varied to modify the final geometry of the extruded rod. For example, it has been found that the four sided concave shape will produce a substantially square outer shape for the rod upon being drawn by the two sets of godet rolls 46-48. As best seen in FIG. 1B, a concentration of cladding material is shown in the corners of the waveguide 10. Additionally, the four corners of the waveguide 10 may also flare outwardly to a small extent in a bead shape as well. While in some applications it may be desirable to modify the process so as to avoid a heavy flow of cladding into the corners of the waveguide, it should be noted that such concentrations of cladding at the corners helps to provide extra material at the areas which may be subject to the most wear.

In operation, the manifold plates 60-62 receive plasticized cladding material from its extruder outlet 36 through the material inlets 86-88 of these plates. The material is then forwarded to the manifolds 82-84 of the plates which provide uniform flow and distribution of the material around the die. The cladding material then flows from the manifolds 82-84 to the layer passageways 90-92, and through the common passageway 94. Simultaneously, the core channel inlet 70 receives plasticized core material from its extruder outlet 38. The core material flows downstream through the core channel 68 until it reaches the core channel outlet 72 which is in fluid communication with the common passageway 94. The core material is there encased within a tube layer of cladding material from the passageway 94, and both materials continue downstream to the forming chamber 74. The core and cladding material flow through the outlet 76 of the forming chamber 74 which forms the material into a four sided concave outer configuration. The material, now a quadrangular concave shaped rod 40 with a solid conducting core layer 12 and an outer cladding layer 14 is discharged from the coextrusion die 34 for further processing as described above.

As is apparent from the foregoing specification, the method and apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of constructing an optical waveguide, comprising the steps of:
   heat plasticizing a core material which is capable of conducting light;
   heat plasticizing a cladding material which has an index of refraction that is lower than the index of refraction of said core material;
   coextruding said cladding material around said core material to form a rod having a predetermined shape having at least one concave side;
   drawing said rod to modify said predetermined shape so that said rod is formed with at least one substantially flat side and a substantially parallel core and cladding interface along said side; and
   cooling said rod below the glass transition temperatures of said cladding and core materials so that said rod will maintain said substantially flat side.

2. The method according to claim 1, wherein said drawing step also provides molecular orientation.

3. The method according to claim 1, wherein said core material is polystyrene and said cladding material is PMMA.

4. The method according to claim 1, wherein said core and cladding materials are coextruded in a die which defines said predetermined shape.

5. The method according to claim 1, wherein said rod is drawn into a quadrangular shape.

6. The method according to claim 1, including the step of forming a light deflecting surface in said rod.

7. The method according to claim 1, wherein at least one of said light deflecting surface is formed by impression of a heated probe.

8. The method according to claim 1, wherein said rod is drawn around godet rolls which are operating at different speeds.

9. The method according to claim 1, wherein said rod is drawn at a temperature above the glass transition temperatures of said core and cladding materials.

10. A method of constructing an optical waveguide, comprising the steps of:
    heat plasticizing a core material which is capable of conducting light;
    heat plasticizing a cladding material which has an index of refraction that is lower than the index of refraction of said core material;
    coextruding said cladding material around said core material to form a rod having a predetermined butterfly shape; and
    enabling said predetermined shape to be modified such that at least one side will be substantially flat and the core and cladding interface along said side will also be substantially flat.

* * * * *